(12) United States Patent
MacFarlane et al.

(10) Patent No.: US 9,790,603 B2
(45) Date of Patent: Oct. 17, 2017

(54) PROCESS AND CATALYST-ELECTROLYTE COMBINATION FOR ELECTROLYSIS

(71) Applicant: MONASH UNIVERSITY, Clayton, Victoria (AU)

(72) Inventors: Douglas MacFarlane, Brighton East (AU); Alexey Izgorodin, East Malvern (AU)

(73) Assignee: AQUAHYDREX PTY LTD, North Wollongong, New South Wales (AU)

( * ) Notice: Subject to any disclaimer, the term of this patent is extended or adjusted under 35 U.S.C. 154(b) by 270 days.

(21) Appl. No.: 14/492,793

(22) Filed: Sep. 22, 2014

(65) Prior Publication Data

US 2015/0108006 A1 Apr. 23, 2015

Related U.S. Application Data

(63) Continuation of application No. PCT/AU2013/000232, filed on Mar. 12, 2013.

(30) Foreign Application Priority Data

Mar. 22, 2012 (AU) ................... 2012901138

(51) Int. Cl.
*C25B 1/30* (2006.01)
*C01B 15/027* (2006.01)

(52) U.S. Cl.
CPC ............. *C25B 1/30* (2013.01); *C01B 15/027* (2013.01)

(58) Field of Classification Search
CPC .................. C25B 1/30; C01B 15/027
See application file for complete search history.

(56) References Cited

U.S. PATENT DOCUMENTS

| 2002/0153262 | A1 | 10/2002 | Uno et al. | |
|---|---|---|---|---|
| 2003/0019758 | A1 | 1/2003 | Gopal et al. | |
| 2007/0012579 | A1* | 1/2007 | Rosvall | ............. C01B 7/03 205/474 |
| 2009/0178931 | A1 | 7/2009 | Faita et al. | |
| 2011/0214996 | A1* | 9/2011 | Yoshida | ............. C01B 3/04 205/633 |

FOREIGN PATENT DOCUMENTS

WO 2012/085174 A1 6/2012

OTHER PUBLICATIONS

International Search Report of PCT/AU2013/000232 dated May 9, 2013 [PCT/ISA/210].
Written Opinion of PCT/AU2013/000232 dated May 9, 2013 [PCT/ISA/237].
International Preliminary Report on Patentability dated Sep. 23, 2014, issued by the International Bureau in corresponding International Application No. PCT/AU2013/000232.

* cited by examiner

*Primary Examiner* — Ciel Thomas
(74) *Attorney, Agent, or Firm* — Sughrue Mion, PLLC

(57) ABSTRACT

The invention relates to a process for electrolysis comprising a cathode and an anode comprising a catalyst, both the cathode and anode at least partly immersed in an electrolyte, the process characterised in that the electrolyte at least partly inhibits further oxidation of a product formed at the anode. Typically the catalyst comprises one or more metal-(Group VIb) semiconductors, and one or more metal-(GroupVIb))-phosphorous species.

11 Claims, 3 Drawing Sheets

PROCESS AND CATALYST-ELECTROLYTE COMBINATION FOR ELECTROLYSIS

CROSS REFERENCE TO RELATED APPLICATIONS

This is a bypass continuation of International Application No. PCT/AU2013/000232 filed Mar. 12, 2013, claiming priority based on Australian Patent Application No. 2012901138 filed Mar. 22, 2012, the contents of all of which are incorporated herein by reference in their entirety.

FIELD OF INVENTION

The present invention relates to the field of electrolysis, particularly water electrolysis including water oxidation or water splitting.

In one form, the invention relates to a process and apparatus for electrolysis.

In one form, the invention relates to a new catalyst-electrolyte combination for electrolysis.

In one particularly preferred aspect the present invention is suitable for electrolytic generation of hydrogen peroxide or radicals capable of forming hydrogen peroxide.

It will be convenient to hereinafter describe the invention in relation to processes for generating hydrogen peroxide, or radicals capable of forming hydrogen peroxide and hydrogen, however it should be appreciated that the present invention is not limited to that use and can be applied to other processes and generation of other products.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

Hydrogen Peroxide

Hydrogen peroxide ($H_2O_2$) is a strong oxidising agent and is considered a highly reactive oxygen species.

Its oxidising capacity is so strong that in concentrated form it is used as a rocket propellant. Its strong oxidising capacity makes it particularly well suited for use as a bleach, cleaning agent and antimicrobial for industrial and domestic use. One of the advantages of hydrogen peroxide is that it is a stronger oxidising agent yet more environmentally acceptable than chlorine based oxidising agents.

The market for hydrogen peroxide is large and continues to expand, for example, from about 1.9 million tonnes in 1994, to 2.2 million tonnes in 2006, to an estimated 4.3 million tonnes 2012. Due to the potential hazardous nature of the processes that involve production, storage and transportation of hydrogen peroxide at high concentration, significant interest recently has been given to the development of alternative production methods, particularly in-situ processes.

Hydrogen peroxide is principally manufactured by the 'anthraquinone process' consisting of the autoxidation of a 2-alkyl anthrahydroquinone (or 2-alkyl-9,10-dihydroxyanthracene) to the corresponding 2-alkyl anthraquinone. For example, the cyclic reaction depicted at equation (1) shows the oxidation of 2-ethyl-9,10-dihydroxyanthracene ($C_{16}H_{12}(OH)_2$) to the corresponding 2-ethylanthraquinone ($C_{16}H_{12}O_2$) and hydrogen peroxide.

equation (1)

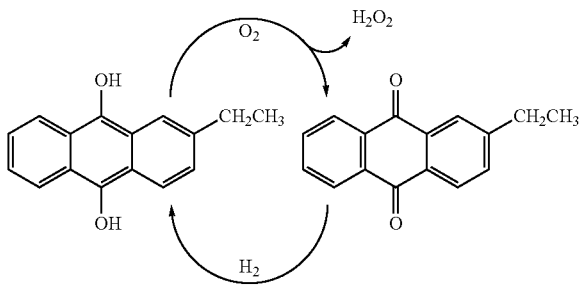

Most manufacturers use the Riedl-Pfleiderer process, which includes the step of bubbling compressed air through a solution of the anthracene. Oxygen in the air reacts with the labile hydrogen atoms of the hydroxy group, giving hydrogen peroxide and regenerating the anthraquinone. The hydrogen peroxide thus generated is extracted and the anthraquinone derivative is reduced back to the dihydroxy (anthracene) compound using hydrogen gas in the presence of a metal catalyst. The cycle is then repeated.

The overall equation for the process is:

$$H_2 + O_2 \rightarrow H_2O_2 \qquad \text{equation (2)}$$

The economics of the process depend heavily on effective recycling of the quinone (which is expensive), extraction solvents, and the catalyst and many attempts have been made to improve the economics of the process.

For example Solvay have improved productivity and reduced the cost of production by optimising the distribution of isomers of 2-amyl anthraquinone and pursuing economies of scale. This improved process was implemented in 2008 in a "mega-scale" single-train plant in Zandvliet (Belgium) and another in 2011 in Map Ta Phut (Thailand). (Hydrogen Peroxide 07/08-03 Report, ChemSystems, May 2009).

Processes for producing hydrogen peroxide directly from the elements has been of interest for many years. However, one of the problems associated with this approach is that the reaction of hydrogen with oxygen thermodynamically favours production of water. While use of a finely dispersed catalyst is beneficial for promoting selectivity to hydrogen peroxide, the selectivity is still not sufficiently high for commercial development of the process. In an effort to improve the selectivity researchers have developed minute (nanometer-size) phase-controlled noble metal crystal particles on carbon support. Evonik Industries, established a pilot plant in Germany in late 2005 using this catalyst and has claimed that there are reductions in investment cost because the process is simpler and involves less equipment. However, the process has the drawbacks of being more corrosive and unproven and yields low concentrations of hydrogen peroxide (about 5-10 wt % as compared with about 40 wt % via the anthraquinone process).

In 2009, another attempt was made to develop a process for direct synthesis using a gold-palladium nanoparticulate catalyst. (G. J. Hutchings et al, Science 2009, 323, 1037) The catalyst is claimed to have the advantage of reducing hydrogen peroxide decomposition and potentially being an inexpensive, efficient and environmentally friendly process. Hydrogen peroxide tends to decompose spontaneously, and even more rapidly under the influence of the catalysts typically used in direct synthesis. However the use of a gold-palladium nanoparticulate catalyst typically achieves only very low concentrations of hydrogen peroxide (less than about 1-2 wt %).

Attempts have also been made to produce alkaline hydrogen peroxide using a monopolar cell to electrolytically reduce oxygen in a dilute sodium hydroxide solution. (Hydrogen Peroxide 07/08-03 Report, ChemSystems, May 2009).

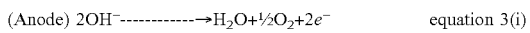
(Anode) $2OH^- \rightarrow H_2O + \frac{1}{2}O_2 + 2e^-$   equation 3(i)

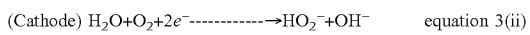
(Cathode) $H_2O + O_2 + 2e^- \rightarrow HO_2^- + OH^-$   equation 3(ii)

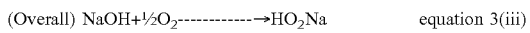
(Overall) $NaOH + \frac{1}{2}O_2 \rightarrow HO_2Na$   equation 3(iii)

It was shown recently that significantly lower production costs can be achieved in the system where hydrogen and hydrogen peroxide are produced simultaneously by water electrolysis. (Ando, Y. and Tanaka T., 'Proposal for a new system for simultaneous production of hydrogen and hydrogen peroxide by water electrolysis', International Journal of Hydrogen Energy, 2004, 29(13), 1349-1354).

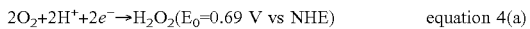
$2O_2 + 2H^+ + 2e^- \rightarrow H_2O_2 (E_0 = 0.69$ V vs NHE)   equation 4(a)

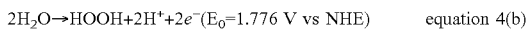
$2H_2O \rightarrow HOOH + 2H^+ + 2e^- (E_0 = 1.776$ V vs NHE)   equation 4(b)

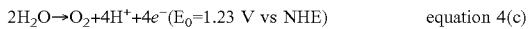
$2H_2O \rightarrow O_2 + 4H^+ + 4e^- (E_0 = 1.23$ V vs NHE)   equation 4(c)

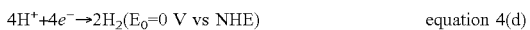
$4H^+ + 4e^- \rightarrow 2H_2 (E_0 = 0$ V vs NHE)   equation 4(d)

In order for this system to be viable, however, the water oxidation catalyst should promote formation of hydrogen peroxide and inhibit the oxygen evolution reaction (equation 4(c)) which is the more thermodynamically favourable process.

A number of carbon electrodes allowed simultaneous production of hydrogen and hydrogen peroxide using 2V total cell potential. However the efficiencies of this process for hydrogen peroxide production (30-50%) and low current densities are not sufficient for practical use. It is clear that the development of catalyst/electrolyte combination which allows water splitting according to equations 4(b) and 4(d) with high efficiency and low overpotential would allow significant reduction in the energy cost of production for hydrogen and hydrogen peroxide via electrochemical water spitting. Alternatively high efficiency electrolysis according to 4(a) and 4(b) would allow hydrogen peroxide production at both electrodes.

The ability to split water to produce hydrogen simultaneously with hydrogen peroxide is of interest in the field of alternative energy technologies, particularly the use of hydrogen production as the main energy carrier in the proposed "hydrogen economy". The fundamental processes for producing and converting hydrogen are well-known and the technologies have proven to be practical in large-scale operation. However, current low temperature water electrolysis processes are only 50-62% energy efficient and a cost analysis as part of the United States Council for Automotive Research, Department of Energy (USCAR/DOE) Hydrogen Roadmap suggests that efficiency improvements to 74% are needed in order to meet the DOE cost goal for hydrogen of $2-$3 per 'gallon of gas equivalent'. The biggest source of inefficiency in these water electrolysis cells is the oxygen generating electrode where substantial over-potentials, typically in excess of 450 mV, are required to generate useful rates of water oxidation. For this reason there has been a major research effort devoted to the development and understanding of novel water oxidation catalysts.

Ideally a water oxidation catalyst should be based on abundant, low cost materials, have high turnover frequencies and remain active over prolonged periods of time. Currently, commercial electrolysers are based on nickel anodes, which require high operational overpotential, and hot alkaline solutions. The most efficient catalysts known are those based on transition metal oxides including, $MnO_x$, $Co_3O_4$, $RuO_2$, and $IrO_2$. On the other hand it has recently been suggested that a process for water electrolysis that proceeds via hydrogen peroxide rather than oxygen may be more energy efficient. In smaller scale processes the hydrogen peroxide itself may be of significant value. In large scale fuel process, the hydrogen peroxide could be directly disproportionated into oxygen and water.

Accordingly there is an ongoing need for processes having improved efficiency or economy for production of hydrogen peroxide.

There is also a need for processes that have reduced reliance on consuming energy from non-renewable sources such as fossil fuels.

SUMMARY OF INVENTION

An object of the present invention is to provide a process for electrolysis having improved efficiency or yield or lower environmental impact compared to analogous processes of the prior art.

Another object of the present invention is to provide a catalyst-electrolyte combination for electrolysis.

Another object of the present invention is to provide an electrochemical process for production of hydrogen peroxide, or radicals capable of forming hydrogen peroxide or hydrogen that can consume energy from a renewable source.

A further object of the present invention is to alleviate at least one disadvantage associated with the related art.

It is an object of the embodiments described herein to overcome or alleviate at least one of the above noted drawbacks of related art systems or to at least provide a useful alternative to related art systems.

In a first aspect of embodiments described herein there is provided a process for electrolysis comprising a cathode and an anode comprising a catalyst, both the cathode and anode at least partly immersed in an electrolyte, the process characterised in that the electrolyte at least partly inhibits further oxidation of a product formed at the anode.

Typically the electrolyte inhibits further oxidation by solvating the product formed at the anode.

In a second aspect of embodiments described herein there is provided a process for electrolytic generation of hydrogen peroxide or radicals for hydrogen peroxide formation, the process comprising the step of passing a current between a cathode and an anode comprising a catalyst, both the cathode and anode being at least partly immersed in an electrolyte comprising a strongly proton-accepting species.

In a particularly preferred embodiment the electrolyte comprises a solvent and one or more dissolved species comprising a strongly proton accepting species. The electrolyte could, for example comprise a basic nitrogen or phosphorus group, and may be substituted. Suitable proton accepting species include (alkyl substituted) pyrrolidine or (alkyl substituted) imidazole. Primary, secondary or tertiary substituted amine groups may be suitable—the tertiary substituted species being less preferred due to their tendency to be easily oxidised. The amine groups would typically be substituted with H, alkyl, aryl, Ph or Bz groups. The electrolyte could comprise an anionic nitrogen or phosphorous species, such as dicyanamide ($(CN)_2N^-$).

The electrolyte may also include an ionic component to ensure that the conductivity of the solution is adequate for electrochemical processes. The ionic component can be a simple salt that is otherwise inert in the process. Alternatively the ionic component can be the protonated form of the proton accepting species. For example if an amine is used in this role, partial neutralisation of the amine with for example sulphuric acid will produce ammonium ions and bisulphate and sulphate ions to fulfil the role of the ionic component. This approach allows facile adjustment of the pH of the electrolyte. It is important in this approach, however, that the neutralisation be only partial so that some level of amine content remains.

The solvent component of the electrolyte may be any suitable liquid such as water.

The solvent component may also be any other solvent which is electrochemically stable at the electrochemical potentials required, for example acetonitrile or glutaronitrile. The solvent component may also be an ionic liquid. In these cases water is added as needed as a reactant to the electrolyte.

In a preferred embodiment the electrolyte is butyl ammonium sulphate dissolved in water.

In particularly preferred embodiment the catalyst comprises:
  one or more metal-(Group VIb) semiconductors, and
  one or more metal-(GroupVIb))-phosphorous species.

For example the metal-(Group VIb) semiconductor may correspond generally to the formula $M_mA_a$ wherein:
  M is a metal,
  A is a Group VIb species, and
  m and a have a value of between 1 and 5.

Furthermore, the metal-(Group VIb)-phosphorous species corresponds generally to the formula $M'_{m'}A'_{a'}P_y$ wherein:
  M' is a metal and may be the same as M,
  A' is a Group VIb species and may be the same as A,
  m, m', a and a' have a value of between 1 and 5,
  P is a phosphorous species, and
  y has a value 0<y<5.

The metal (M or M') may be any metal traditionally used in semiconductors, but would typically include elements such as Ti, Mo, Mn, Fe, Co, Ni, Cu, Zn, Ga, Ir, Cd, In, Sn and the rare-earth metals. The term 'metal' is to be construed as including one elemental metal or combinations of two or more elemental metals.

The Group VIb species (A or A') may include any non-radioactive member of the chalcogens, namely oxygen, sulphur, selenium and tellurium. For the avoidance of doubt, references herein to Group VIb is designated according to the old IUPAC (European) system and corresponds to (i) Group VIA of the CAS (American) system, and (ii) Group 16 of the new IUPAC system. (Leigh, G J, Nomenclature of Inorganic Chemistry: Recommendations 1990, Blackwell Science.)

In a particularly preferred embodiment the process is used for generation of hydrogen peroxide or radicals capable of forming hydrogen peroxide. Said radicals are typically extremely short lived and highly reactive, having oxidation states intermediate between $H_2O$ and $H_2O_2$ and includes solvated species.

The hydrogen peroxide thus produced may be consumed for a range of commercial or industrial products. It may be used in-situ in the electrolyte to carry out oxidation reactions of substrates of commercial or industrial importance in which hydrogen peroxide is typically used. Such a process could be carried in a continuous or semi-continuous fashion if the substrate is added and the oxidised products removed continuously from the electrolyte. Alternatively the hydrogen peroxide or radicals capable of forming hydrogen peroxide may be formed as an intermediate, for example in the water splitting process for the production of hydrogen.

Without wishing to be bound by theory, it is believed that in the process of the present invention, the $H_2O_2$ dissolves into the electrolyte, stabilised by interactions with the electrolyte species. These interactions may take the form of hydrogen bonding interactions. Complex formation may also take place depending on the nature of the electrolyte. The catalyst electrolyte combination diverts the water oxidation process into hydrogen peroxide production according to equation 5;

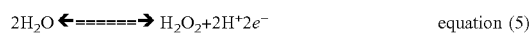

equation (5)

Optimally, the process is additionally used for water electrolysis to produce hydrogen and has the advantage that no gaseous oxygen is directly produced. By contrast, oxidation processes of the prior art directly oxidise water to oxygen which requires large over-potentials (energy losses), the oxygen additionally being detrimental to cell components, the efficiency of the hydrogen producing reaction and the purity of hydrogen stream.

In yet a further aspect of embodiments described herein there is provided a process for generation of hydrogen peroxide by electrolysis comprising the step of passing a current between a cathode and a $MnO_x$ coated gold anode, both the cathode and anode being at least partly immersed in an electrolyte comprising butylammonium sulphate.

In further aspect of embodiments described herein there is provided an electrolytic cell for generation of hydrogen peroxide by electrolysis, the cell comprising a cathode and a $MnO_x$ coated gold anode and an electrolyte comprising butylammonium sulphate wherein in use both the cathode and anode are at least partly immersed in the electrolyte during the passing a current between the cathode and anode.

Other aspects and preferred forms are disclosed in the specification and/or defined in the appended claims, forming a part of the description of the invention.

In essence, embodiments of the present invention stem from the realization that a catalyst electrolyte combination could be used to inhibit oxidation of a product formed during electrolysis. With particular reference to hydrogen peroxide production, it has been realised that this can be used to divert a water oxidation process into hydrogen peroxide production by solvating the hydrogen peroxide and moving it away from the electrode so that further oxidation does not readily take place. Put differently, it is clear that the development of catalyst/electrolyte combination which allows water splitting according to equations 4(b) and 4(d) with high efficiency and low overpotential would allow significant reduction in the energy cost of production for hydrogen and hydrogen peroxide via electrochemical water splitting. Alternatively high efficiency electrolysis according to 4(a) and 4(b) would allow hydrogen peroxide production at both electrodes.

Advantages provided by the present invention comprise the following:
  it permits the generation of hydrogen peroxide by electrolysis, that is, by use of electricity as the energy source as compared prior art processes which typically use fossil fuels as the energy source;

it provides an alternate oxidation process for water that does not directly product gaseous oxygen, thus avoiding oxidation detrimental to cell components and hydrogen stream;

it supports high efficiency, low overpotential oxidation of water to hydrogen peroxide.

Other advantages of the present invention can be illustrated by reference to the following two non-limiting applications of the present invention:

(i) Hydrogen Peroxide Production for Use In-Situ or Use, after Separation from the Electrolyte, in all of the Standard Applications of Hydrogen Peroxide.

In-situ use would involve contacting the hydrogen peroxide solution in the electrolyte with a substrate that is to be oxidised. Extraction of the oxidised substrate affords the product. For example, the oxidation process which is the subject of this invention can be coupled in a reactor in which wood pulp bleaching is carried out, the continuous production of hydrogen peroxide rendering this process more efficient.

Optimally for this application the water oxidation process would be coupled with an oxygen reduction electrode which produces hydrogen peroxide at the cathode through the reduction of oxygen gas according to equation 6.

$$2O2+4e-+2H2O \rightarrow 2HOO-+2OH- \qquad \text{equation 6}$$

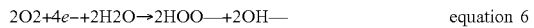

Thus hydrogen peroxide is simultaneously produced at both electrodes. This process allows generation of the hydrogen peroxide on-site at chemical installations where it can be consumed, avoiding transportation costs.

For off site use, extraction can also be used to recover the standard hydrogen peroxide solution that is used widely in the chemical industry.

(ii) Use in Water Splitting Processes

Water splitting processes under development in laboratories around the world rely on water oxidation as the overall oxidation process. This typically requires large over-potentials and therefore large energy losses. The catalyst/electrolyte combination of the present invention provides a more efficient water oxidation process. By restricting the oxidation to hydrogen peroxide production lower over-potentials can be utilised, improving the overall energy profile of the process. The hydrogen peroxide solution created can then be caused to decompose by a second catalyst via equation 7:

$$2H_2O_2 \Longleftrightarrow H_2O+O_2 \qquad \text{equation 7}$$

This second step can be carried out in situ in the water electrolysis cell. Alternatively, in a preferred embodiment, the electrolyte can be drained into a separate cell containing a bed of the second catalyst to thus initiate release of the oxygen. This provides the advantage of removing oxygen bubbles from the vicinity of the water oxidation electrode where the oxygen bubbles would otherwise have a damaging corrosive effect.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

Figure 1:
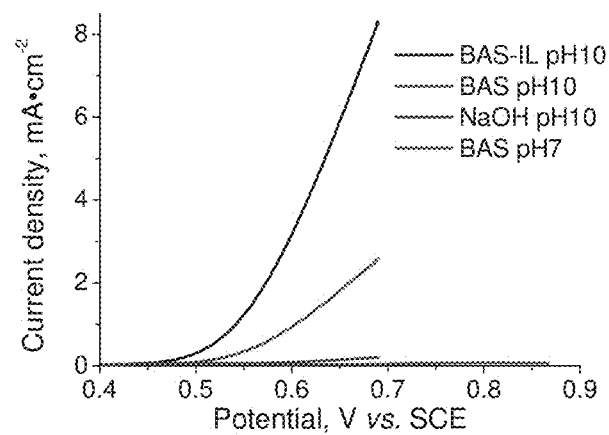
FIG. 1 illustrates linear scan voltamograms of the MnOx electrodes in BAS electrolyte and aqueous NaOH electrolyte performed at scan rate of 1 mV s$^{-1}$.

Aspects of the invention will be further described with reference to the following non-limiting examples:

Materials: Manganese (II) acetate tetrahydrate 99.99% (Mn(Ac)$_2$.3H2O), butylamine 99.5%, ethylamine 99.5% and sulphuric acid were purchased from Sigma-Aldrich Pty. Ltd. Nitric acid was purchased from Merck. Potassium permanganate, oxalic acid, diphenylamine. Hydrogen peroxide. Unless otherwise stated, reagent grade water (18 MΩ-cm resistivity) was used for all experiments. All chemicals were used as received.

Ethyl ammonium nitrate (EAN) was prepared by mixing ethylammonium hydroxide with nitric acid. A typical procedure for EAN synthesis is as follows: 50 ml of ethylamine (0.76 mole) was added to 200 ml of water and kept agitated using magnetic stirring. Then a small amount 2 M nitric acid solution was added drop wise until pH 7 was recorded using a Mettler Toledo InLab® micro pH electrode. Finally water was removed from the mixture over 2 hours in a rotary evaporator at 50° C. and 20 kPa.

The electrolyte for hydrogen peroxide synthesis—butyl ammonium sulphate (BAS) was prepared by mixing 0.08 moles of butyl amine with 0.04 moles of sulphuric acid in a 100 ml standard volumetric flask. High ionic strength butyl ammonium sulphate electrolyte (BAS-IL) was prepared by mixing 0.4 moles of butyl amine with 0.2 moles of sulphuric acid in a 100 ml standard volumetric; this yields salt water mixture. The pH of the electrolytes was adjusted to 10 through addition of small amount of butylamine with pH recorded using a Mettler Toledo InLab® micro pH electrode.

Electrochemical Experiments: Electrochemical experiments were performed on a PAR VMP2Z potentiostat with a standard three-electrode configuration. The MnO$_x$ films deposited on Au electrodes were used as an anode with a Pt counter electrode used as cathode. The working area of the electrode was masked using Kapton tape, leaving a 0.5 cm×0.5 cm electrode area. A 66-EE009 ("No-Leak") Ag/AgCl (Cypress Systems) and standard calomel electrodes were used as a reference. All electrochemical measurements unless otherwise stated were performed at room temperature (RT) of about 22° C.

MnOx Electrodeposition: Thin films of MnOx were deposited on the gold electrodes from ethylammonium nitrate ionic liquid with 10 vol. % of water and 0.01 M manganese acetate at 120° C. using constant current density of 200 µA cm$^{-2}$ for 10 minutes, as described in more detail elsewhere.

Characterisation Techniques: The amount of hydrogen peroxide was determined using a solution of potassium permanganate. A stock solution of 0.119 M potassium permanganate was prepared and standardised. A diluted solution of 5.78·10$^{-3}$ M potassium permanganate was used for titration. In a typical procedure 0.25 ml of 0.8 M BAS electrolyte at pH 10 was added to the 0.25 ml of 1M H$_2$SO$_4$ and titrated using 5.78 10$^{-3}$ M potassium permanganate solution.

A useful second indicator for the presence of hydrogen peroxide involves its action as an oxidant, reflecting its possible use for in-situ oxidation reactions. Thus 1% of diphenylamine in concentrated sulphuric acid was oxidised in the H$_2$O$_2$ solution. In a typical procedure 0.1 ml of 0.8 M BAS electrolyte at pH 10 was added to the 0.2 ml of the diphenylamine solution.

UV-Vis transmission spectra were recorded at room temperature using a Cary 1E UV-visible spectrophotometer.

Results: Linear scan voltammograms of the manganese catalyst were measured in a range of electrolytes and are shown in FIG. 1. High oxidation current densities were observed in BAS and BAS-IL electrolytes at oxidation potential above 0.5 V vs. SCE. It can be seen, however, that there were only negligible current densities at potentials below 0.6 V vs. SCE when aqueous sodium hydroxide was used as an electrolyte. Similarly low currents were observed in the neutral BAS electrolyte, in accord with the previously reported low catalytic activity of manganese based catalysts in neutral electrolytes.

The equilibrium potential for water oxidation at various pH's can be calculated from $E_{anodic}$=1.23–0.059 (pH)–0.244, V vs. SCE. It can be seen that at pH 10, the equilibrium potential for water oxidation is around 0.4 V vs. SCE and high overpotential is required to oxidise water in the electrolyte containing sodium hydroxide. The neutral BAS electrolyte shows very little activity, indicating that this currents involved at pH 10 are the result of a strongly pH sensitive process.

Attempts to determine oxygen production from the electrolysis at pH 10 produced only very small rates of oxygen evolution. Oxidation of the electrolyte was also investigated as oxidation of amines is a well known process, though typically at higher potentials than those in use here. Despite passage of substantial quantities of charge no evidence of decomposition was seen in Nuclear Magnetic Resonance or mass spectroscopy (ESI) results. This led us to suspect the formation of some product of water oxidation intermediate between water and oxygen. Classic colourmetric tests for hydrogen peroxide including potassium permanganate reduction and diphenylamine oxidation both proved strongly positive for the presence of H$_2$O$_2$.

In order to determine efficiency of the process for hydrogen peroxide production a series of electrolytes was used during oxidation at constant potential of 0.59 V vs. Ag/AgCl. The amount of charge passed was kept at 200 mC and equivalent to 1.04 µmoles of H$_2$O$_2$ based on Faraday's law assuming a 2 electron oxidation of water. Standard titration of hydrogen peroxide with potassium permanganate solution assumes reduction to Mn(II) as per equation 7.

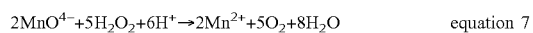

$$2MnO_4^- + 5H_2O_2 + 6H^+ \rightarrow 2Mn^{2+} + 5O_2 + 8H_2O \quad \text{equation 7}$$

Figure 2A:
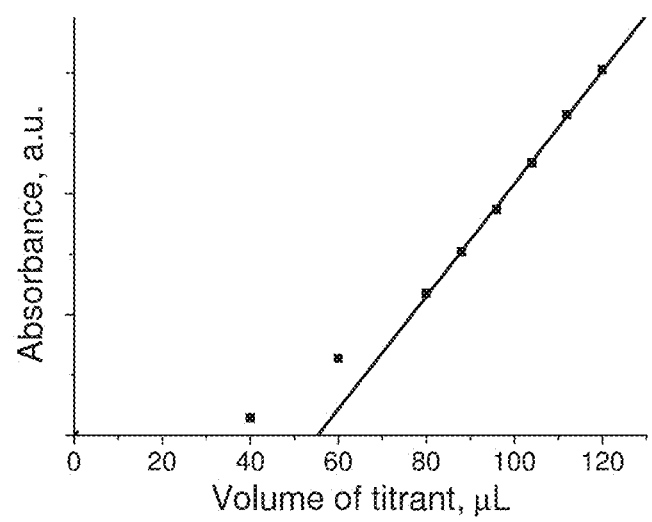
FIG. 2A illustrates absorbance of MnO$^{4-}$ at 565 nm added to the BAS electrolyte after electrolysis (200 mC) to form hydrogen peroxide.
Figure 2B:
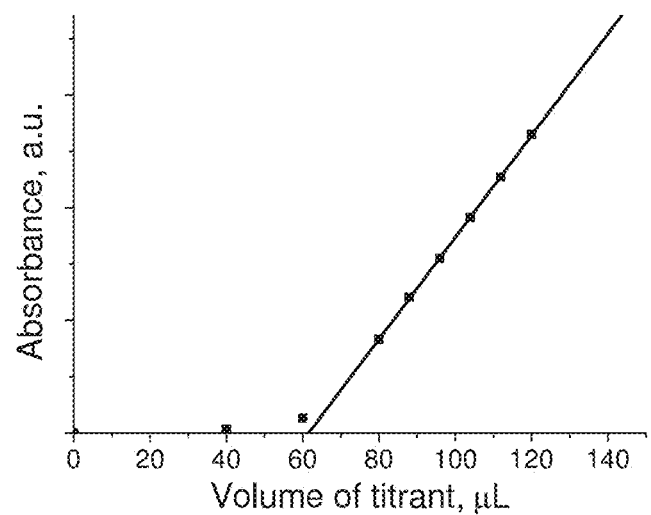
FIG. 2B illustrates absorbance of MnO$^{4-}$ at 565 nm added to the BAS electrolyte after addition of a known amount of standard hydrogen peroxide.

In order to improve sensitivity, electrolytes were titrated in a standard UV-Vis cell, with the amount of potassium permanganate determined by measuring absorbance value at 565 nm. The value of absorbance at 565 nm as a function of amount of potassium permanganate added to a pH 10 BAS electrolyte after 200 mC oxidation is shown in FIG. 2A. The end of titration was determined as a point where a linear fit function of the absorbance at high amount of titrant added extrapolates to zero. In the example of FIG. 1 the end point is taken as 55.4 µL, which is equivalent to 0.08 µmoles of H$_2$O$_2$ or a production yield of about 77% from Faraday's Law for a 2 electron process. In a control experiment where 1.04 µmoles H$_2$O$_2$ was directly added to the electrolyte medium, as can be seen in FIG. 2B, the detected amount of H$_2$O$_2$ was around 86%.

The hydrated ionic liquid form of this electrolyte (BAS-IL) produces the highest currents at any given overpotential (FIG. 1). To the extent that the formation of a solvated hydrogen peroxide species involving the electrolyte is the rate determining step in this process, it is to be expected that the high salt concentration will enhance the rates of reaction. Lower production yields of about 64% were obtained from the titration of the BAS-IL electrolyte after 200 mC of electrolysis.

The lower than 100% efficiency detected in these experiments may be due to the competing process of water oxidation to oxygen during the electrolysis experiment and/or continuous loss of hydrogen peroxide from the electrolyte through the standard disproportionation to water and oxygen (described by the equation 2H$_2$O$_2$=H$_2$O+O$_2$) which is known to be catalysed by alkaline solutions and the presence of ammonia. The lower yield in the BAS-IL electrolyte is also concordant with this due to the much higher free amine content in this electrolyte.

Figure 3:
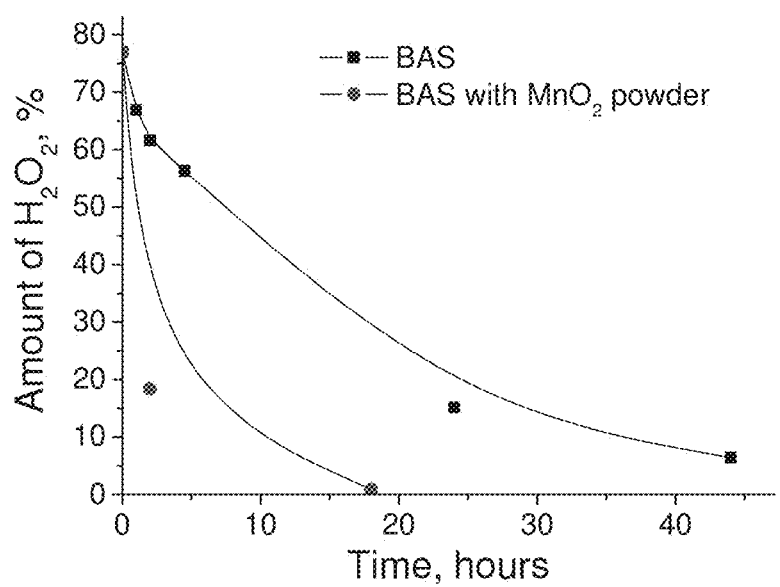
FIG. 3 illustrates the concentration of H$_2$O$_2$ detected over time in the BAS electrolyte with and without MnO$_2$ disproportionation catalyst.

In order to investigate the longer term stability of the hydrogen peroxide in the BAS electrolyte, the concentration of H$_2$O$_2$ was determined at various time intervals after electrochemical oxidation was complete. It can be seen from FIG. 3 that the concentration of H$_2$O$_2$ in the BAS electrolyte drops steadily over the course of 24 hours with some amount present even after 40 hours. When a small amount of manganese dioxide (which is a known catalyst for the disproportionation reaction) was added to the mixture, the amount of H$_2$O$_2$ drops significantly within first few hours and is negligible after 18 hours.

Figure 4:
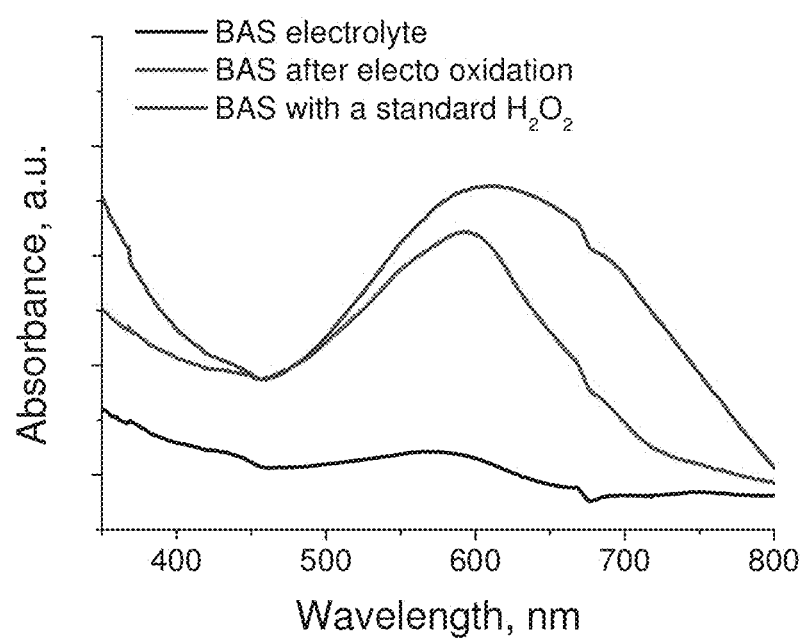
FIG. 4 illustrates diphenylamine redox indicator in as prepared BAS electrolyte, BAS with electro chemically produced hydrogen peroxide and BAS with standard hydrogen peroxide.

The use of electrochemically prepared hydrogen peroxide as an oxidant was confirmed using standard test with diphenylamine as an indicator. The UV-Visible spectra of the electrolytes are shown in FIG. 4. It can be seen that presence of hydrogen peroxide leads to oxidation of diphenylamine and formation of violet diphenylbenzedine (III).

Thermodynamics of Hydrogen Peroxide Production in Amine Electrolytes.

Importantly the potentials involved in the processes in FIG. 1 are lower than the normally expected equilibrium potential for the H$_2$O/H$_2$O$_2$ reaction at pH 10. However, the results obtained clearly support the hypothesis that the electrolyte solvation is a critical aspect of the reaction in this case. It appears that the solvation is sufficient to lower the E0 to the range studied in FIG. 1. This is not an unusual event—electrolyte solvation is capable of shifting redox potentials by as much as 1 V for example in the case of Au/(Au(III).

The over potential for this process on the catalyst can be expected to be less than the full 4e H$_2$O/O$_2$ process. In fact the high overpotentials required for water oxidation over many catalysts are a result of mechanisms that proceed via peroxy intermediates. In the present case a solvated form of hydrogen peroxide becomes the main product because the solvation process carries it away from the electrode into the bulk.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A process for water electrolysis comprising:
   providing a cathode and an anode, the anode containing a catalyst,
   providing an electrolyte,
   immersing both the cathode and anode at least partly in the electrolyte, and
   selectively transforming water at the anode to hydrogen peroxide or radicals capable of forming hydrogen peroxide,
   wherein the electrolyte at least partly inhibits further oxidation of the hydrogen peroxide formed at the anode,
   wherein the catalyst comprises one or more metal-(GroupVIb))-phosphorous species,
   wherein the one or more metal-(Group VIb)-phosphorous species satisfies the formula $M'_{m'}A'_{a'}P_y$ wherein:
   M' is a metal,
   A' is a Group VIb species,
   m' and a' have a value of between 1 and 5,
   P is a phosphorous species, and
   y has a value $0<y<5$.

2. The process-according to claim 1, wherein the electrolyte comprises a proton-accepting species.

3. The process according to claim 1, wherein the electrolyte comprises a solvent and one or more dissolved species comprising a proton accepting species.

4. The process according to claim 3, wherein the electrolyte also comprises an ionic component.

5. The process according to claim 1, wherein the electrolyte is butyl ammonium sulphate dissolved in water.

6. The process according to claim 1, wherein the catalyst comprises:
   one or more metal-(Group VIb) semiconductors.

7. The process according to claim 6, wherein the one or more metal-(Group VIb) semiconductors correspond to the formula $M_m A_a$ wherein:
   M is a metal,
   A is a Group VIb species, and
   m and a have a value of between 1 and 5.

8. The process-according to claim 7, wherein the metal is selected from the group consisting of Ti, Mo, Mn, Fe, Co, Ni, Cu, Zn, Ga, Ir, Cd, In, Sn, the rare-earth metals, and combinations thereof.

9. The process according to claim 7, wherein the Group VIb species is selected from the group consisting of oxygen, sulphur, selenium and tellurium.

10. The process according to claim 1, wherein the electrolyte comprises an ionic liquid or a hydrated ionic liquid.

11. A process for water electrolysis comprising:
    providing a cathode and an anode, the anode containing a catalyst,
    providing an electrolyte,
    immersing both the cathode and anode at least partly in the electrolyte, and
    selectively transforming water at the anode to hydrogen peroxide or radicals capable of forming hydrogen peroxide,
    wherein the electrolyte at least partly inhibits further oxidation of the hydrogen peroxide formed at the anode, and
    wherein the electrolyte is butyl ammonium sulphate dissolved in water.

* * * * *